(12) United States Patent
Löttgen et al.

(10) Patent No.: US 6,957,121 B2
(45) Date of Patent: Oct. 18, 2005

(54) METHOD AND AN OPERATOR SUPPORT SYSTEM FOR ASSISTING AN OPERATOR IN SETTING MACHINE PARAMETERS

(75) Inventors: Ralf Löttgen, Biel/Bienne (DE); Marc Etienne, Biel/Bienne (CH); Jean-Phillippe Besuchet, Medway, MA (US)

(73) Assignee: Mikron Comp-Tec AG, Nidau (CH)

( * ) Notice: Subject to any disclaimer, the term of this patent is extended or adjusted under 35 U.S.C. 154(b) by 68 days.

(21) Appl. No.: 10/235,879

(22) Filed: Sep. 5, 2002

(65) Prior Publication Data

US 2003/0045964 A1 Mar. 6, 2003

(30) Foreign Application Priority Data

Sep. 5, 2001 (EP) .............................................. 01121306

(51) Int. Cl.⁷ .............................................. G06F 19/00
(52) U.S. Cl. ........................ 700/180; 700/160; 700/172; 700/173
(58) Field of Search ................................ 700/180, 173, 700/206, 193, 162, 175, 179, 185, 86, 172, 181, 160; 219/69, 17; 205/640

(56) References Cited

U.S. PATENT DOCUMENTS

| | | | | |
|---|---|---|---|---|
| 4,992,948 A | * | 2/1991 | Pilland et al. | 700/173 |
| 5,276,606 A | | 1/1994 | Mizukami et al. | 364/191 |
| 5,550,744 A | * | 8/1996 | Steinbichler | 700/206 |
| 5,751,589 A | | 5/1998 | Sato et al. | 364/474.35 |
| 5,838,595 A | | 11/1998 | Sullivan et al. | 364/578 |
| 5,922,187 A | | 7/1999 | Fornera et al. | 205/640 |

FOREIGN PATENT DOCUMENTS

| | | |
|---|---|---|
| DE | 41 38 092 A1 | 6/1992 |
| DE | 198 56 098 C2 | 6/2000 |
| EP | 0 062 077 A1 | 10/1982 |
| EP | 0 166 783 A1 | 1/1986 |
| EP | 0 643 344 A1 | 3/1995 |
| EP | 1 034 880 A1 | 9/2000 |
| JP | 57-114325 | * 7/1982 |
| JP | 62130130 | 12/1987 |

OTHER PUBLICATIONS

*Determining the Cutting Conditions for Sculptured Surface Machining*, The International Journal of Advanced Manufactoring Technology, 8(1993) No. 2, Berlin, Germany, pp. 61–70.

* cited by examiner

Primary Examiner—Leo Picard
Assistant Examiner—Steven R. Garland
(74) Attorney, Agent, or Firm—Marshall, Gerstein & Borun LLP

(57) ABSTRACT

A method is provided for assisting an operator in setting optimized machine parameters of a machine tool. The machine parameters are used for controlling the machining. The method comprises manual selecting priority values for at least two mutually dependent target values representing the machining performance and automatically determining the machine parameters based on the selected priority values. A corresponding operator support system is also provided.

25 Claims, 10 Drawing Sheets

METHOD AND AN OPERATOR SUPPORT SYSTEM FOR ASSISTING AN OPERATOR IN SETTING MACHINE PARAMETERS

FIELD OF THE INVENTION

The present disclosure relates generally to machine tools, and more particularly, to a method and an operator support system for assisting an operator in setting machine parameters.

BACKGROUND

High performance machine tools require a machine specific configuration of their CNC (computer numerical control) which is tuned before leaving the factory. The factory tuning, however, is a compromise among various target values for optimizing the machining process as it can not be optimized for a specific machining process. To overcome this deficiency, in some cases more than one predefined tuning configurations may be preinstalled by the factory, which then can be activated as required.

Another approach may make certain tuning parameters available to the operator to be adjusted. However, those tuning parameters are usually part of a complex control system that is difficult to interpret and that can severely damage the machine tool in case they are not set correctly. Therefore, the optimal use of the machine depends on the knowledge of the machine operator and his experience in tuning the machine parameters. Those machine parameters are for example cutting parameters like feed, speed, step over etc. For simple 2D operations and for materials easy to machine, the operators may still be able to handle the optimization of these parameters. However, with the introduction of high performance milling, applications have been extended to complex 3D geometries and to materials difficult to machine. At the same time, the performance of the machine hardware and CNC were significantly increased, permitting higher speeds and feeds to be applied. Therefore, the known optimization parameters were not adequate any more to take advantage of those improvements.

Moreover, some additional machine parameters had to be created or made accessible for the optimization of the machining process. However, contrary to the traditional optimization parameters, which were, from an operator's point of view, relatively easy to adjust, the new parameters require a different level of professional education in order to really understand their impact on the machining process. Consequently, today machine operators may have problems to exploit the high performance of such machine tools.

To this end, it is a task for machine tool manufacturers to provide a way to simplify the process of optimizing the machine parameters so that the customers can take fully advantage of the machine capabilities.

OVERVIEW OF THE DISCLOSURE

A method is provided for assisting an operator in setting optimized machine parameters of a tool machine. The machine parameters are used for controlling the machining. The method comprises manually selecting priority values for at least two mutually dependent target values representing the machine performance and automatically determining the machine parameters based on the selected priority values.

Additionally, an operator support system is provided for assisting an operator in setting optimized machine parameters of a machine tool. The machine parameters are used for controlling the machining. The operator support system comprises a user interface for selecting priority values for at least two mutually dependent target values representing the machining performance and means for automatically determining the machine parameters based on the selected priority values.

Other features are inherent in the disclosed method and operator support system or will become apparent to those skilled in the art from the following detailed description of embodiments and its accompanying drawings.

DETAILED DESCRIPTION OF THE PREFERRED EXAMPLES

Figure 1:
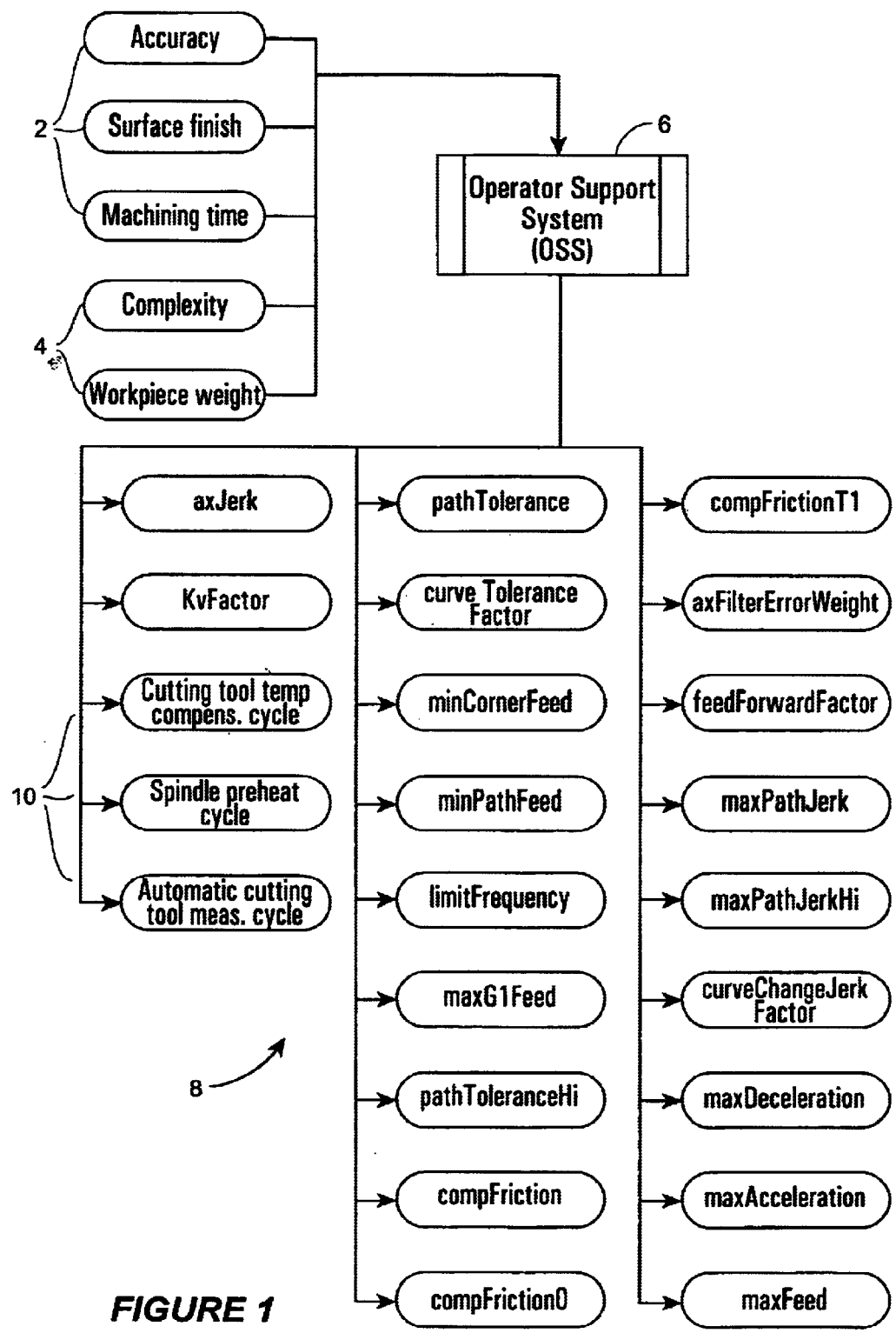
FIG. 1 is a flow diagram showing target values and machine parameters of a preferred operator support system (OSS).

In the following, the preferred embodiments are described in detail. A possible set of target values and job attributes of the operator support system (OSS) and its resulting machine and cycle parameters for the preferred embodiment are depicted in FIG. 1. Before proceeding further with the description, however, several items of the preferred embodiments will be discussed.

The preferred embodiments provide an operator of a machine tool with the possibility to optimize the tuning of his machine by assisting him in setting optimized machine parameters. More particularly, the method allows for setting priorities among target values that represent the machining performance or the quality of the machining process. Examples for those target values are the best possible surface finish of the workpiece, the fastest possible machining time and the best possible accuracy of the contour in the cutting process. However, the target values are not limited to those three target values. Other target values may be used, additional target values may be added or only two target values might be used in an alternative embodiment.

Those target values are usually trade off parameters in achieving an overall optimization of the machining. This means, that e.g. all three target values surface finish, machining time and accuracy cannot be optimized at the same time. For example, decreasing the machining time will reduce the contour accuracy and vice versa. Therefore, the operator is required to select manually priority values for the mutually dependent target values in order to achieve a compromise among those trade off parameters that is the best possible for a specific machining task.

The method then automatically determines the machine parameters based on the selected priority values. A machine parameter is a setting used by the CNC (computer numerical control) in order to tune the dynamic behavior and the configuration of the machine. Examples for machine parameters are the path tolerance defining the maximum deviation of the actual contour from the rated contour, the minimum feed rate for contouring, the cut-off frequency for the commended position filter etc. These machine parameters and their interaction and dependency are often difficult to understand for an operator of a machine tool.

Therefore, the method of the preferred embodiments replaces the difficult task to set and optimize the machine parameters by a more simple to use means by selecting priority values for a relatively small set of target values representing the basic machine performance and machining properties.

Preferably, the machine parameters determined by the method of the preferred embodiments are automatically applied to a control system of a machine tool in order to control the machining. This means that the determined machine parameters are transferred directly to the CNC of the machine tool. However, it is also possible that the method is executed on a remote computer and the determined machine parameters are transferred to the CNC of the machine tool via a network or a portable storage medium, or the determined machine parameters are manually inserted in the CNC of the machine tool.

Preferably, the automatic determination of the machine parameters is performed by mapping the selected priority values onto the machine parameters by using a data base. In this data base the best configuration of machine parameters for a given priority of the target values is stored. These predefined values for the machine parameters may be determined by previous tests, experience or expert knowledge. Other possibilities to obtain the best possible configuration of machine parameters for a given selection of priority values for the target values are by interpolation of known configurations of machine parameters, by explicitly calculating the machine parameters based on models representing the physics of the machine tool, or by some kind of learning procedure based on previous machining parameters and on feedback loops from measurements of the actual machining parameters.

One preferred way to implement such a data base is to store a table containing for all possible priority selections predefined values of the machine parameters.

Modern machine tools dispose of a series of so-called machine cycles. A machine cycle is a predefined procedure executed by the machine or the CNC in order to achieve a certain effect. A typical example of such a machine cycle is to dwell at program spindle speed for temperature settlement after a tool change. Therefore, in order to take fully advantage of the capability of the machine tool, specific automatic cycles are executed as a function of the priority of the target values. This means that based on the selected priority values the method automatically determines whether specific machine cycles are activated or deactivated.

It is also preferred that the automatic determination of the machine parameters is further based on selected job attributes. These job attributes are used in addition to the target values for further optimizing the tuning of the machine parameters and machine cycles. The tuned machine parameters and cycles may be the same as those tuned by selecting the target values, but are usually—at least partly—different. Additional attributes are, for example, the workpiece weight or its mass inertia, the axis trust as a function of the workpiece weight, or the contour complexity. The selection of those job attributes may also be performed using a dialogue window or automatically using measurement results.

Preferably, at least part of the determined machine parameters and/or the determined activation/non-activation of the machine cycles are displayed. This allows the experienced user to verify the result of the operator support system and the inexperienced user to learn about the relationship between the target values and the machine parameters.

Preferably, the operator support system provides a possibility for the operator to manually adjust at least a subset of the determined machine parameters and, most preferably, all cycle parameters, i.e. the activation or non-activation of the machine cycles. The operator is thus allowed to explicitly set discrete values for a selection of machine parameters and to activate or deactivate all machine cycles using a manual tuning window (MTW). Similar to the machine and cycle parameters that are automatically determined by the method, the effect of the manual adjustment of the machine and cycle parameters on the target values may be determined and displayed in particular cases. The advantage of this direct access to the machine parameters and machine cycles is to permit the operator to verify the actions induced by the operator support system and to generate a better understanding of the influence of the parameters and how to further tune them into the direction of increased machine performance.

In an advantageous embodiment, prior to executing a machining operation, the control verifies if all the required tuning-sets are available in the control. Preferably, the operator assistance for the manual selection of target values is automatically launched when one or several of the required tuning-sets is not available in the control.

It is preferred to structure the different machining objects and machining steps in the CNC in an hierarchical object oriented model. Such an object oriented structure is disclosed in the German Patent Application with publication no. 198 56 098 of which the content is incorporated herein by reference. Basically, the objects of such an object oriented structure are, for example, a workpiece, a group of workpieces, the geometry of a workpiece, a group of machinings etc., or machining steps such as roughing, semifinishing, finishing or superfinishing. The method of the preferred embodiments now allows the user to optionally select different priority values for different machining objects. For example, different priority values may be assigned to various workpiece geometries or each of the machining steps roughing, semifinishing, finishing or superfinishing may be assigned different priority values. By this way, the machine tuning can be easily specified and optimized for the operation in question and does not need to be a compromise for the various machining processes.

However, it is also possible to structure a certain number of tools which are preferably arranged in an automatic tool changer. In this case, a specific machining priority can be assigned to each specific tool. An adequate tuning set is then loaded during the tool change operation.

In principle, any combination of priority values for the target values is possible. For example, any percent value within the continuous range from 0 to 100 may be specified by the operator. However, in order to keep the number of possible sets of priority values at a reasonable and manageable amount, it is preferred, that the priority values are selected from a limited number of priority values.

In the preferred embodiments the priority values can be selected manually by using a graphical user interface (GUI), which is a specific man-machine interface (MMI) window displayed on a computer screen that is used by the operator to set priorities.

One useful way to specify priorities for the target values is to assign a number between 0 and 100 to each of the target values, whereas the sum of those numbers equals 100. Hence, in the case of only two target values, specifying one priority value for one of the two target values does automatically imply the priority value of the other target value. In order to keep the necessary user interaction as small as possible, the preferred embodiments most preferably allow the user to select the various priority values by only one user action. In particular when more than two target values are used, it is preferred to use an input means (e.g. a joystick) to select the priority values by basically one user action by selecting a position of the input means, wherein the position corresponds to different priority values of the target values.

Most preferably, this is realized by graphically moving a marker within an area displayed on the computer screen, wherein the position of the marker corresponds to certain priority values of the target values. One preferred way to assign priority values to more than two target values is to position the marker within the displayed polygon area in which each polygon vertex corresponds to one target value. Then the distance between the position of the marker and a vertex is proportional to the corresponding priority value, i.e. the smaller the distance to the vertex, the higher the priority of the corresponding target value. This is a very user intuitive and easy way to specify more than two priority values that requires only one user action.

Most preferably, the displayed polygon is a triangle or a rhombus.

The preferred embodiments of the operator support system are compatible with any kind of machine tools. However, the system is particularly helpful for any kind of cutting tool, milling tool or electro-erosion tool. More general, it can also be used for manipulators or other highly dynamic axle drives where the targets of path speed and path exactness face each other.

It is possible that the selection of the priorities (i.e the prioritisation of target values) for a certain machining is already carried out upon a preparation stage of the machining, for example at the programming station (CAM-station). Thus, the manual prioritisation of the target values can be implemented on a CAM-station.

Now coming back to FIG. 1, the input and output parameters of the operator support system (OSS) will be explained. In the flow diagram of FIG. 1 target values 2 and job attributes 4 serve as input parameters for the operator support system 6 to determine machine parameters 8 and cycle parameters 10. The target values 2 used in the preferred embodiments are the best possible surface finish, the fastest possible machining time and the best possible accuracy of the contours.

One of the job attributes 4 is the workpiece weight. With machine tools were the workpiece effectuates at least one movement, a rough estimation of the workpiece weight is especially helpful. As long as the machine tool allows several clamping possibilities and as long as this variance influences the mass inertia, the information about those clamping possibilities can also be added as additional job attribute to the operator support system. Alternatively, the mass inertia can also directly be evaluated by means of an automatic machine cycle. In this case, the machine tool performs one or more defined accelerating slopes and establishes the mass inertia from the current consumption or other criteria that are related with the mass inertia. As a further alternative, the machine can perform a preliminary self-tuning cycle, thus minimizing the interference effect of the mass inertia.

The second job attribute 4 of the preferred embodiments is the estimated contour complexity. There are three classes provided to classify the contour in "simple", "cornered" or "curved". Alternatively, this information can be obtained directly from the control system by analyzing the contour elements of the present machining program.

Using these input parameters, the operator support system determines the machine parameters 8 and the cycle parameters 10 using a predefined mapping table. As a function of the user specified priorities for the target values 2 and the job attributes 4, the machine cycles 10 are activated or deactivated.

For example, the cutting tool temperature compensation cycle automatically activates a dwell time after a cutting tool change and before measuring the cutting tool dimensions. During this time, the cutting tool should spin at the speed programmed for the operation that it is going to execute. The purpose of this machine cycle is to allow the cutting tool to terminate its thermal growth by adapting its temperature to the temperature of the spindle. This leads to a gain in accuracy at the cost of an increased machining time.

The spindle preheat cycle automatically activates a dwell time before a machining operation is started in order to allow sufficient time for thermal growth. It usually needs to be activated only after long standstill of the spindle. As for the cutting tool temperature compensation cycle, the advantage is a gain in accuracy. However, the drawback of the spindle preheat cycle is a significantly increased machining time.

Path tolerance, minimal path feed, minimal corner feed, curve tolerance factor and cut off frequency are important machine parameters 8 that are set by the operator support system 6.

The parameter "path tolerance" limits the deviation of the actual contour from the rated contour by defining a maximum distance from each point of the contour line, perpendicular to the contour.

The parameter "minimal path feed" specifies a minimum feed rate for contouring. For those parts of a workpiece geometry, which has been identified as corners by a look ahead system, the feed rate is specified by the parameter "minimal corner feed". Both, the "minimal path feed" and the "minimal corner feed" are technological parameters, meaning that they are of utmost importance to permit a successful cutting process. Therefore, these parameters have a higher priority than the "path tolerance". An optimal trade-off between these parameters and the required tolerance has to be determined.

The look ahead system is capable of identifying certain areas of a geometry as curves. Those areas usually do not have a tight tolerance or are difficult to measure. For those parts of the geometry, the parameter "curve tolerance factor" allows to loosen up the tolerance and thereby allows higher feed rates and a better surface finish.

The parameter "limit frequency" changes the cut of frequency for the commanded position filter. A lower cut of frequency will make the machine run smoother, which will give the impression of a better surface finish, while the dynamic tolerance will deteriorate. A higher cut off frequency will make the machine tool run harder or more aggressively, which will force the machine tool within a tighter dynamic tolerance and therefore lead to a better accuracy, while the surface finish usually deterioriates.

Only from the interaction of those above mentioned important machine parameters, it becomes obvious that a direct optimization of the machine parameters by the operator is a very complex and difficult task.

Figure 2:
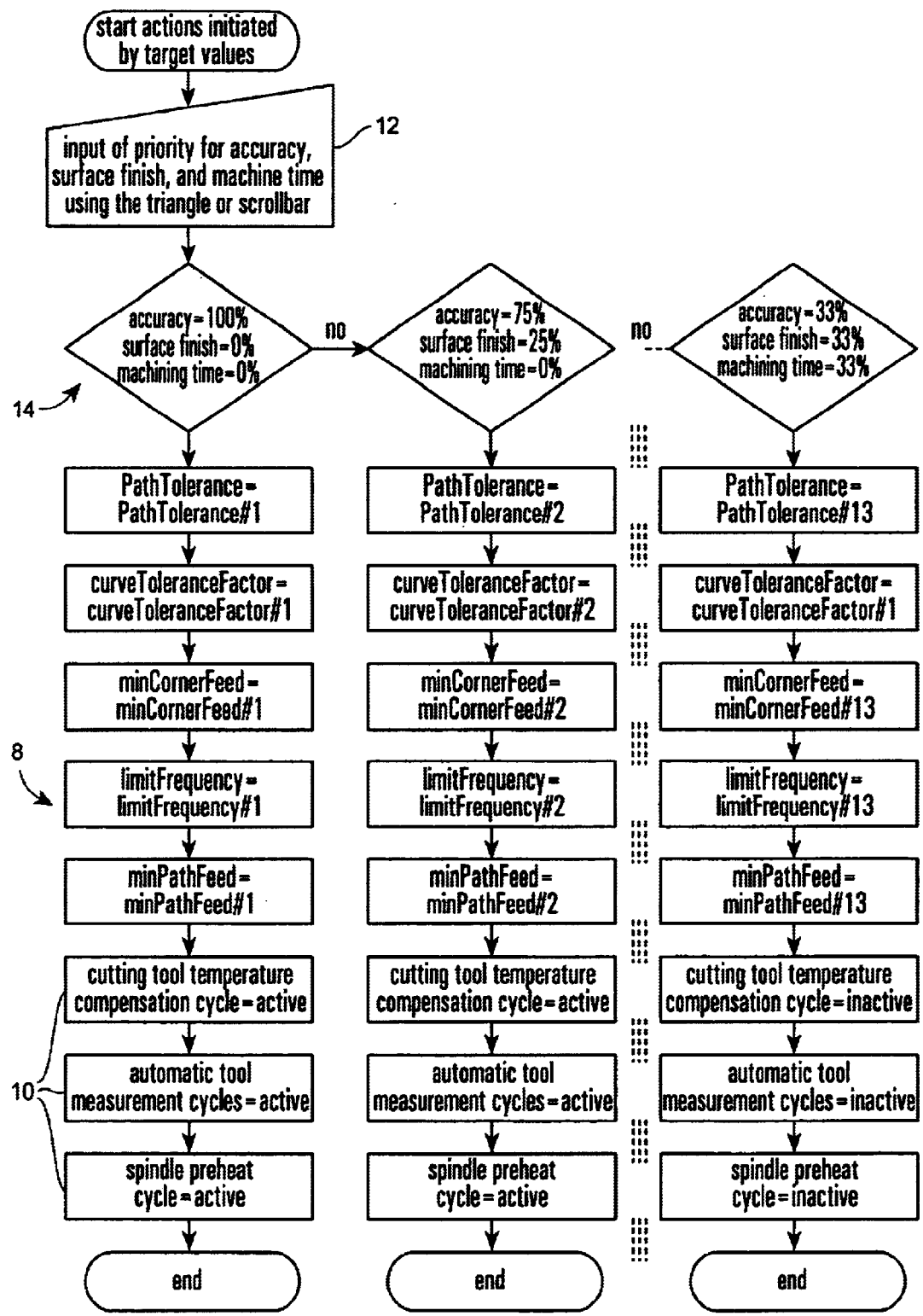
FIG. 2 is a flow diagram representing the mapping of priority value configurations to machine parameters and cycle parameters.
Figure 6:
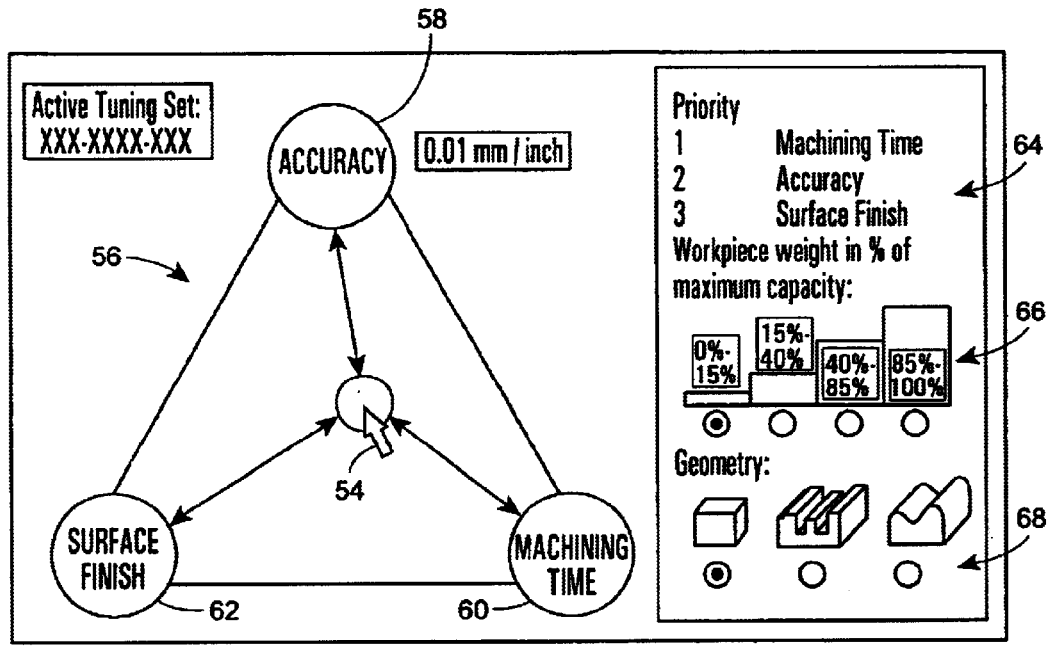
FIG. 6 depicts a graphical user interface for setting priority values and job attributes.
Figure 8:
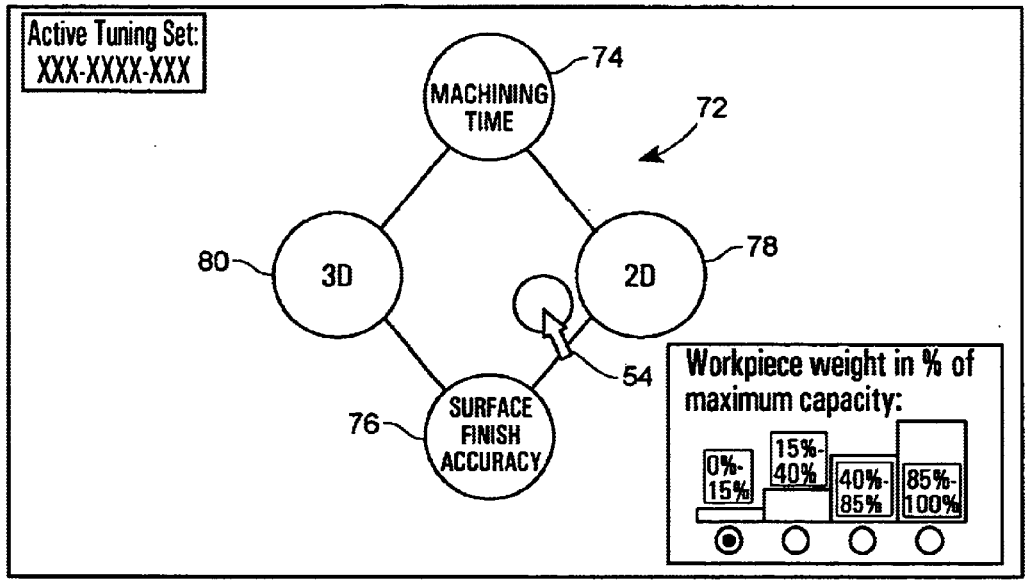
FIG. 8 depicts an alternative graphical user interface.
Figure 12:
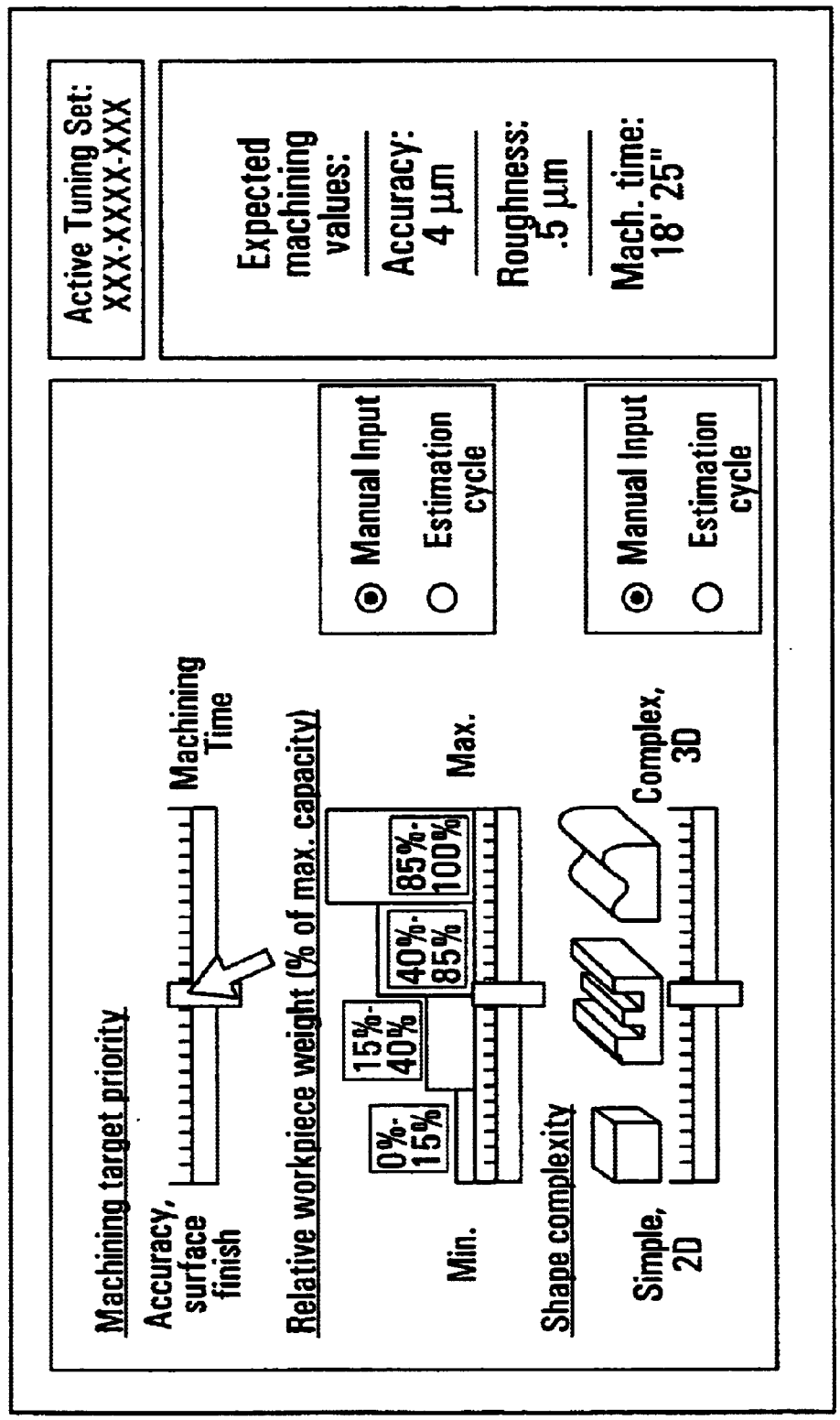
FIG. 12 depicts another alternative graphical user interface.

The flow diagram of FIG. 2 represents the mapping of the target values accuracy, surface finish and machining time to machine parameters 8 and cycle parameters 10. The priority values are input by the operator in step 12 of FIG. 2 via a graphical user interface using either a scroll bar as depicted in FIG. 12, a triangle as depicted in FIG. 6, or a rhombus as depicted in FIG. 8. Depending on the selected set of priority values, in step 14 the corresponding set of machine parameters 8 and cycle parameters 10 are retrieved from a predefined table.

Figure 3:
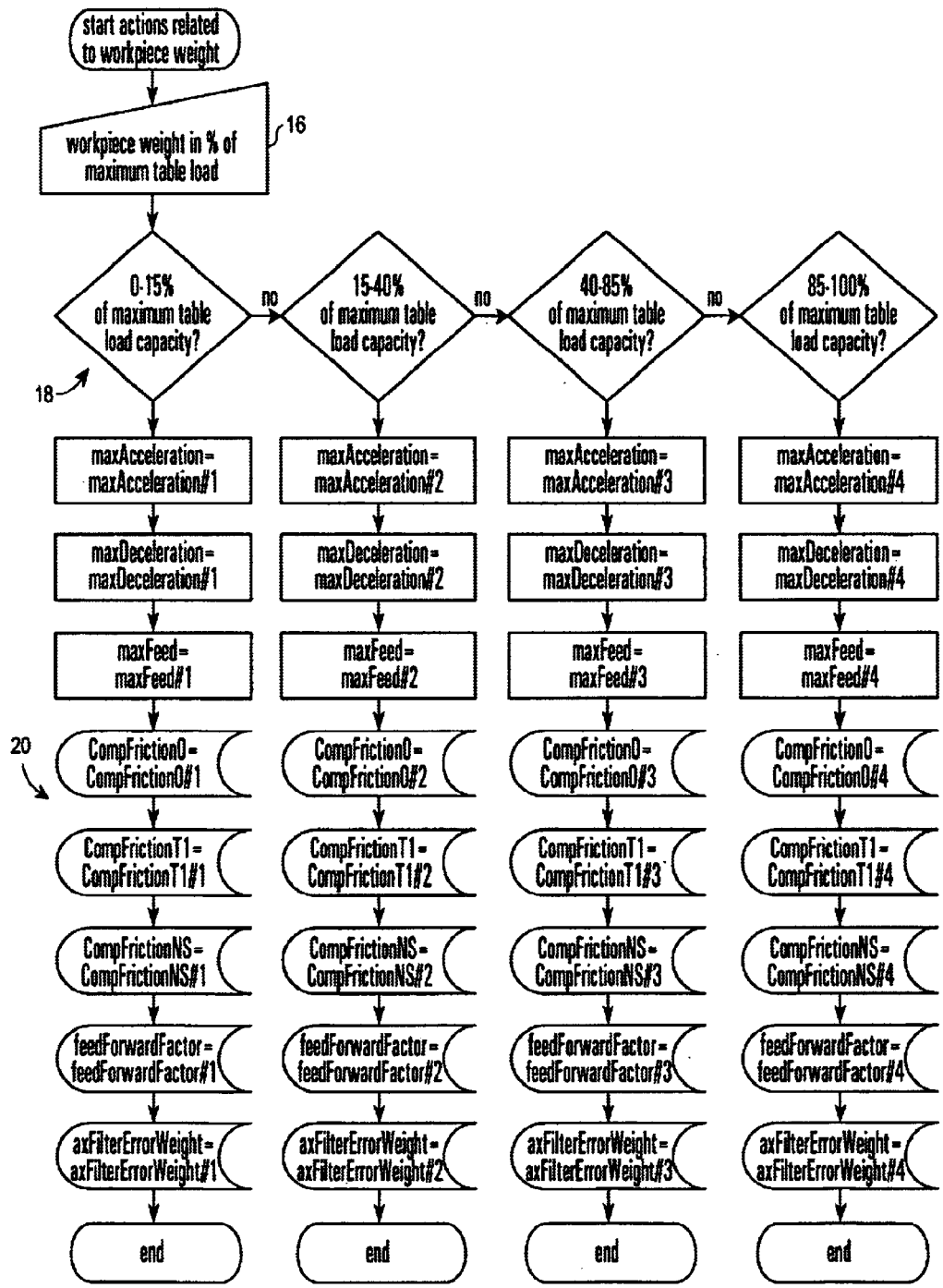
FIG. 3 is a flow diagram representing the mapping of job attributes to machine parameters.

In the flow chart of FIG. 3 the workpiece weight is depicted as an example for the mapping of a job attribute to the machine parameters 20. In step 16 of FIG. 3 the workpiece weight in percent of the maximum table load is provided by the operator via the graphical user interface. Step 18 determines in which of the four ranges the actual workpiece weight falls and retrieves the corresponding set of machine parameters 20 from a predefined table.

Figure 4:
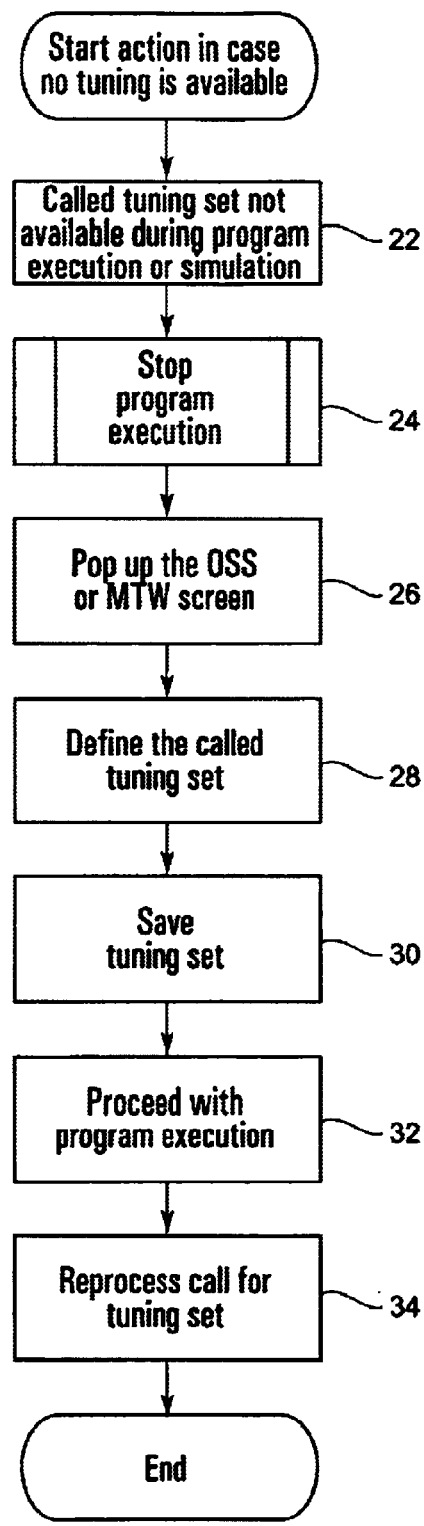
FIG. 4 is a flow diagram illustrating the execution of the operator support system in course of the numerical control program.

The flow diagram of FIG. 4 illustrates the execution of the operator support system in course of the numerical control (NC) program. The given NC-program is pre-processed on the machine tool. The pre-processor will automatically detect specific spots within the NC-program such as a call 22 of a tuning set of machine parameters or a tool change. At each of those spots the pre-processor will offer the possibility to create and insert a new machine tuning or to activate predefined machine cycles, when the called tuning set is not available during program execution. The program stops the execution (24), pops up, in step 26, the operator support system (OSS) or the manual tuning window (MTW) in which the operator can define the called tuning set (28) either manually (MTW) or by specifying priority values for the target values (OSS). In step 30 the generated tuning set will be stored as NC compatible tables before the program execution proceeds (32) by a reprocess call for the tuning set (34). Therefore, the machine parameters are optimized for the next section of NC-program.

The offered insertion spots are locations within the NC-program which separate between the normal sequential steps of a machining process (e.g. roughing, semi-finishing and finishing) or between cutting tools of entirely different geometry etc. In this way, the machine tuning can be optimized for the operation in question and thus avoiding a compromise with regard to the machine parameters.

Figure 5:
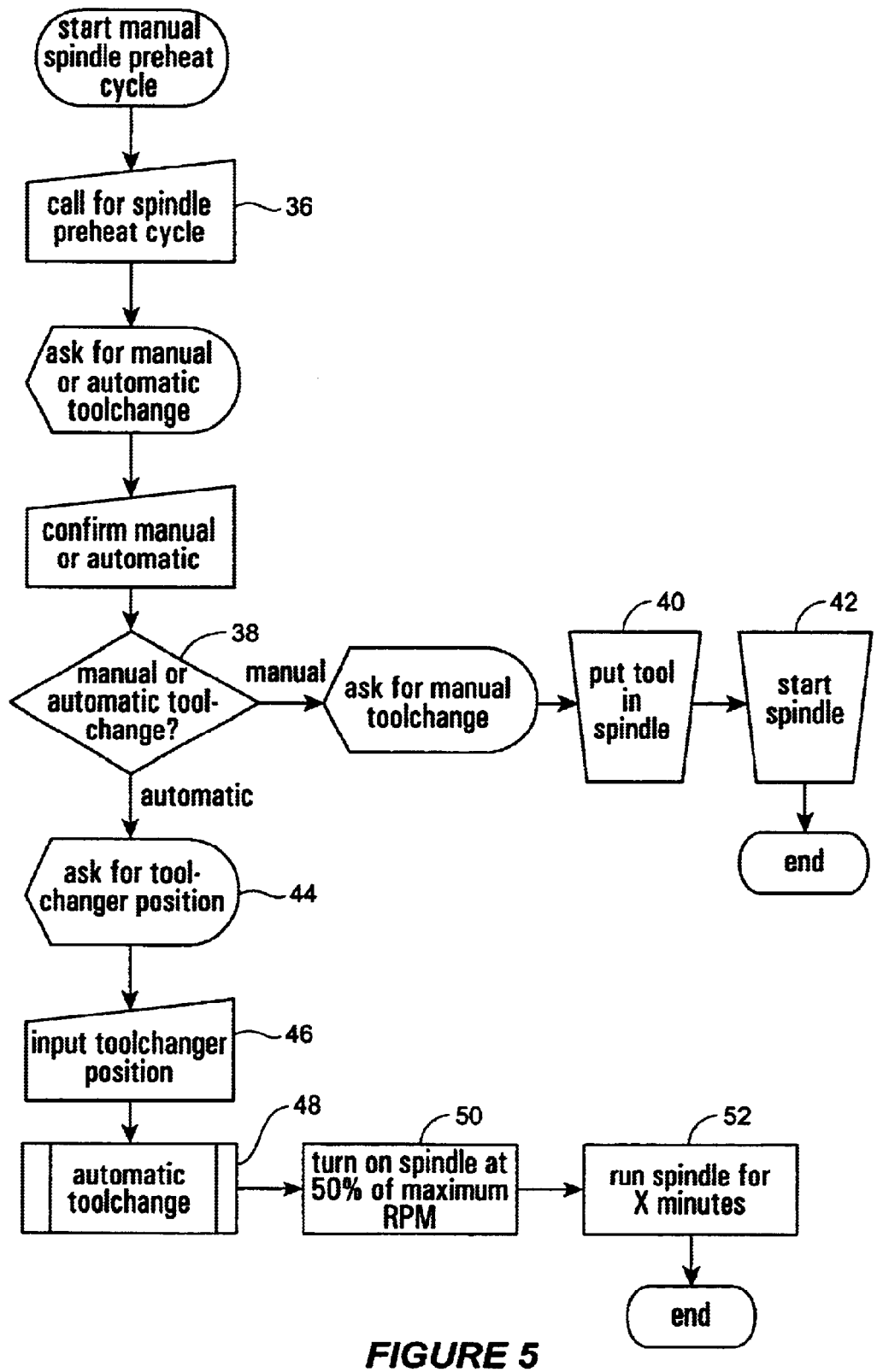
FIG. 5 is a flow diagram showing the steps of the procedure of a spindle preheat cycle.

The flow diagram of FIG. 5 shows the steps of the procedure of a spindle preheat cycle. A spindle preheat cycle activates a dwell time before a machining operation is started in order to allow sufficient time for thermal growth and thus leading to a gain in accuracy, while obviously increasing the machining time. It usually needs to be activated only after longer standstill of the spindle, e.g. after a tool change.

In this example of a machine cycle of the preferred embodiments, the spindle preheat cycle is started manually by a corresponding call 36. In step 38 the operator is asked whether a manual or automatic tool change should be performed. In case of a manual tool change, the operator is asked to put the new tool in the spindle (40) and to start the spindle (42). In case of an automatic tool change, the operator is asked for the tool changer position (44). Based on the tool changer position (46) provided by the operator the automatic tool change is performed (48) and the spindle is turned on, for instance, at 50% of the maximum speed (50). By running the spindle for a predefined number of minutes (52) a sufficient time for thermal growth is provided.

FIG. 6 illustrates a graphical user interface for setting priority values and job attributes. In the preferred embodiments, the graphical element 56 for selecting priority values for the target values has a triangle shape showing the three target values accuracy 58, machining time 60 and surface finish 62 at the edges of the triangle. The graphical element 56 permits to prioritize among the target values 58, 60, 62 using the mouse or another pointing device (marker) 54. The priority values are generated by dragging the pointer within the triangle: The closer the pointer 54 is to an edge, the higher is the priority of the corresponding target value. The OSS will list the target values according to the priority within a separate section 64 of the screen. Thus, the operator is shown an intuitive man-machine interface which can be used without further explanation.

In section 66 and 68 of the screen, the operator can select additional job attributes. He is able to choose among four ranges of the workpiece weight in percent of maximum capacity by clicking on the corresponding item in section 66. In section 68 the job attribute "geometry" or "contour complexity" can be assigned by the operator. In the preferred embodiment the three contour complexities "simple", "cornered" and "curved" are provided.

Figure 7:
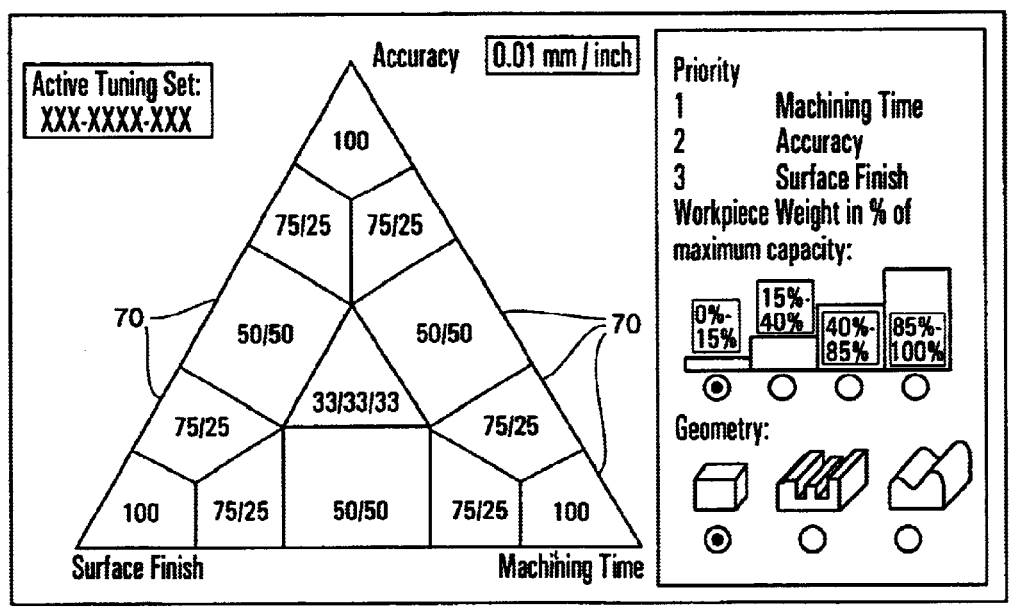
FIG. 7 illustrates the assigning of priority values in response to a user action.

In FIG. 7 the assigning of priority values to a user action is illustrated. The triangle diagram is preferably separated into discrete areas 70 driving an identical setting of machine and cycle parameters. The purpose of the discrete areas is to limit the number of possible sets to a reasonable and manageable amount.

Dragging the pointer within the triangle results in jumping from one area to the next. This prevents the operator from believing that there has been made a change while the pointer still activates the same set of machine parameters and machine cycles.

FIG. 8 illustrates an alternative embodiment of the graphical user interface having a rhombus shaped graphical element 72. The graphical element shows at one corner the target value "machining time" 74 and on the opposed corner "surface finish" and "accuracy" 76. The other two corners 78 and 80 define respectively an essentially two-dimensional and essentially three-dimensional machining process.

Another alternative embodiment of the graphical user interface is illustrated in FIG. 12. In this embodiment, a priority value for two mutually dependent target values, accuracy and machining time, can be selected by means of a scroll bar.

Figure 9:
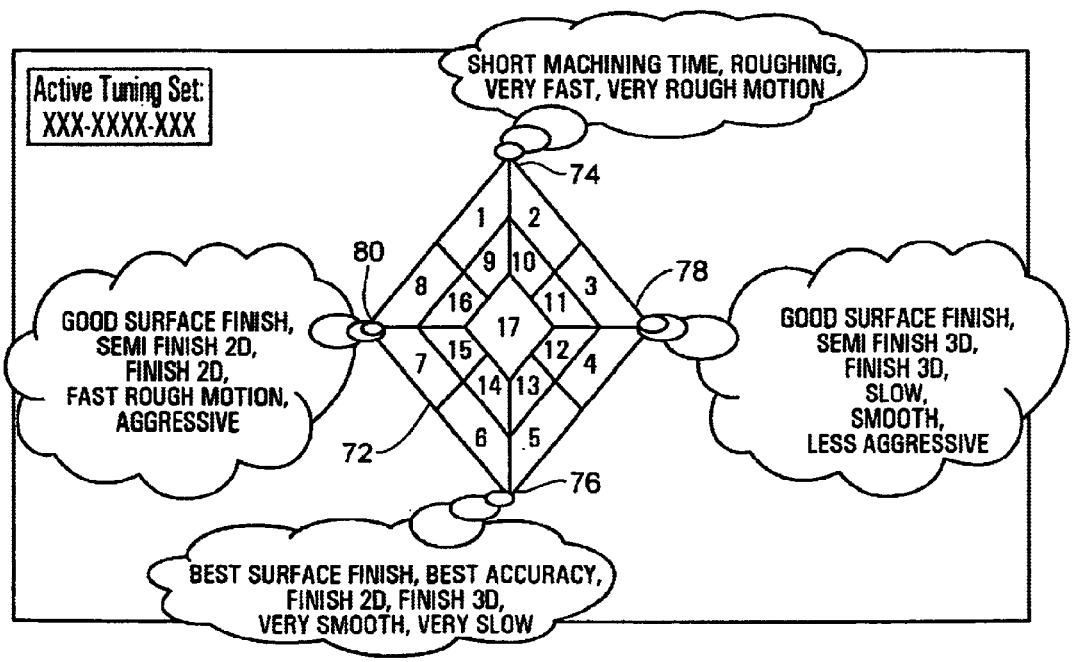
FIG. 9 illustrates the assigning of priority values in response to a user action for the alternative graphical user interface.

In FIG. 9 the assigning of a user action to priority values for the alternative embodiment of the graphical user interface of FIG. 8 is illustrated. As in the previous embodiment, the diagram is separated into discrete areas driving an identical setting of machine and cycle parameters in order to limit the number of possible sets. The priority distribution is made like in the previous embodiment by dragging the pointer towards one of the desired corners of the rhombus. Giving priority to a short machining time 74 will result in roughing, very fast and very rough motion, whereas giving priority to the best surface finish and best accuracy 76 will result in very smooth and very slow motion. On the other hand, moving the pointer towards 80 for an essentially two-dimensional machining process results in a good surface finish and a fast, aggressive and rough motion, whereas choosing 78 for an essentially three-dimensional machining process results in a good surface finish with a slow, smooth and less aggressive motion.

The graphical elements of the operator support system can have alternative layouts, however, there will always be at least two, preferably three, target values and a plurality of tuning sets assigned to different regions under the priority areas.

Figure 10:
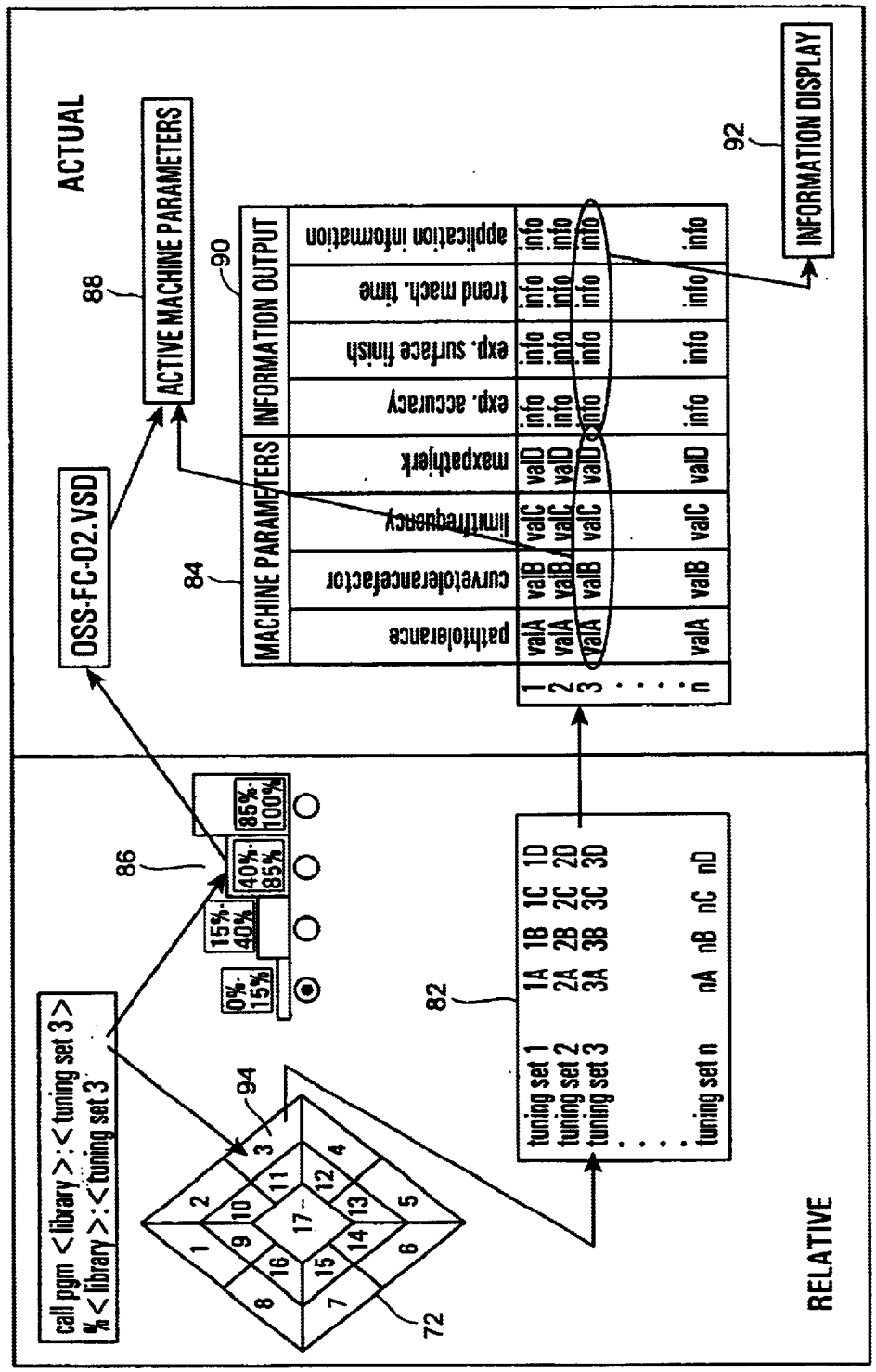
FIG. 10 provides an overview of the procedure of mapping priority values to machine parameters.

FIG. 10 provides an overview of the procedure of mapping priority values to machine parameters. The priority configuration 94 chosen from the operator in the graphical element 72 is used as input in the mapping table 82. The mapping table 82 may simply be a Microsoft Excel™ table or any other database program. In the mapping table 82 for each priority configuration 94 a tuning set is stored with predefined values of machine and cycle parameters 84. The operator has then the possibility to edit manually at least a subset of the machine parameters. Together with the parameters from the job attributes 86 the machine parameters 84 are transferred to the CNC of the machine tool as active machine parameters 88. The choice of the priority drives a number of information outputs 90 that are displayed in the information display 92, showing in particular the target values that can be expected when working with the user assigned priority setting 94.

The user specifies only the relative priority of the machining target values and appoints the machine to take the coherence of the machine parameters and choose the adequate tuning set. Therefore, the use of the described operator support system may not lead to an optimal tuning, however, the method guarantees an appropriate tuning and, thus, a good machine performance even for not particularly experienced personnel. The advantage of a higher exploitation of the capability of the machine tool and the user friendliness of the graphical user interface are accompanied by the advantage of a limited time expense for the tuning operation. Thus, the performance of the machine can be optimized for specific machining processes in a simple and stable way.

Figure 11:
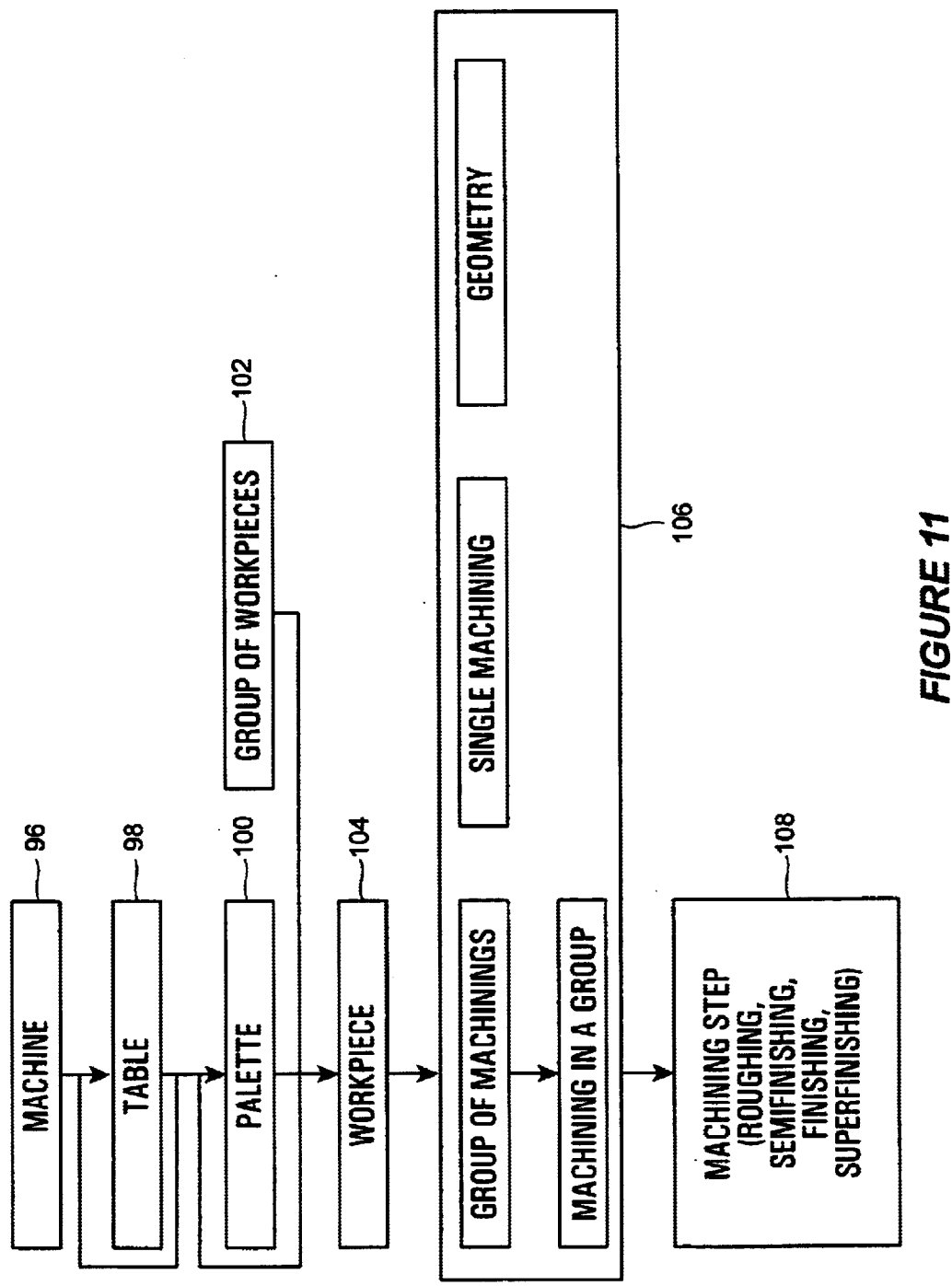
FIG. 11 displays an objects structure of a machining process.

FIG. 11 displays possible objects of a machining process and their relationship to each other. The machining objects and machining steps are defined according to an hierarchical object oriented data model that is disclosed in the German Patent Application with publication no. 198 56 098 of which the content is incorporated herein by reference. The objects of a machine tool can comprise e.g. a machining table 98, a pallet 100 or a group of workpieces 102, the components of which are workpieces 104. Additional objects 106 of the object orientated data model can be connected with the above mentioned objects, such as the geometry of a workpiece to be machined, or a group of machinings. To each object different machining steps 108, such as roughing, semifinishing, finishing, superfinishing, can be assigned.

In the preferred embodiments, using the operator support system, an individual tuning of the machine and cycle parameters can individually be assigned to each of the objects of the machine tool and to each single machining step. However, it is the choice of the operator up to which level of detail he wants to optimally adapt the machining and cycle parameters. The hierarchical object orientated data model supports the operator in this task in a very convenient way. For example, the operator may specify a certain tuning set for a whole group of workpieces 102 by only specifying once an optimized set of machine parameters that will automatically be applied to the whole group of workpieces. However, the operator is still able to overwrite the settings, for example, for a special single workpiece 104 out of the group of workpieces 102. Similar, a certain tuning set may be specified for each individual machining step 108 roughing, semifinishing, finishing and superfinishing, which may then by applied to all objects, for example, of a certain table 98.

In the preferred embodiments it is also possible to configure the operator support system in that the actual tuning set is valid until a new tuning set will be defined, or, contrary to this configuration, a default tuning set, that fits best to the requirements of a certain client, will be applied after each machining step unless the operator defines an individual tuning step.

A typical example for applying the method and the operator support system according to the invention may be in the machining of a jet mold for a plastic housing comprising various platines and plugs. In this example, the machining time may have low priority since enough machining capability is available. After the workpiece is placed on the table of the machine tool, the NC-program is loaded and the operator support system is executed, asking the operator to define priority values for the target values machining time, accuracy and surface finish for each of the machining steps roughing, semifinishing and superfinishing, respectively. For the machining step roughing, the pointer 54 of FIG. 6 may be set close to the position 60 of the triangle 56 giving a high priority to the machining time, i.e. carrying out the roughing with maximum speed. For the semifinishing, the pointer 54 may be placed in the middle between the corners 58 and 62 of the triangle 56 defining a compromise between accuracy and surface finish. Finally, for the finishing, the best possible surface finish should be achieved and, thus, the highest surface finish priority is selected by choosing the corner 62 of the triangle 56.

The operator knows the weight of the workpiece and, thus, may choose directly the corresponding workpiece weight category of the menu 66 in FIG. 6 without using a special machine cycle for determining the workpiece weight. Also the contour complexity may be known and set to "cornered" in the menu 68 of FIG. 6 corresponding to the button in the middle. The priority values are then mapped to the corresponding tuning set and the machining is started by carrying out automatic measurement cycles before and in between the various machining steps.

As a benefit of the simple and intuitive layout of the operator support system, the operator can perform the tuning of the machine parameters in only a few moments. The client obtains the best possible machining result in a very short machining time, being a significant advantage compared to a fixed tuning set for all machining steps.

Also certain methods and systems constructed in accordance with the teaching of the invention have been described herein, the scope of coverage of this patent is not limited thereto. On the contrary, this patent covers all embodiments of the teaching of the invention fairly falling within the scope of the appended claims either literally or under the doctrine of equivalence.

What is claimed is:

1. A method for assisting an operator in setting optimized machine parameters and cycle parameters of a milling machine tool, wherein the machine parameters and cycle parameters are used for controlling machining, comprising manually selecting priority values for at least two mutually dependent target values representing machining performance selected from the group consisting of accuracy, surface finish, and machine time;

selecting job attributes selected from the group consisting of complexity and workpiece weight; and automatically determining cycle parameters and machine parameters based on the selected priority values and job a tributes.

2. The method of claim 1, wherein the determined machine parameters are automatically applied to a control system for controlling machining.

3. The method of claim 1, wherein automatically determining the machine parameters comprises mapping the selected priority values onto the machine parameters by using at least one of a data base and a structured file system.

4. The method of claim 3, wherein the data base comprises a predefined table.

5. The method according to claim 1, wherein automatically determining the machine parameters further comprises automatically determining activation or non-activation of machine cycles based on the selected priority values.

6. The method according to claim 5, further comprising displaying at least one of the determined machine parameters and the determined activation/non-activation of the machine cycles.

7. The method according to claim 5, further comprising manually adjusting the determined activation/non-activation of the machine cycles.

8. The method of claim 7, further comprising determining and displaying an effect of manually adjusting the machine parameters on the target values.

9. The method according to claim 1, wherein selecting the job attributes is either manually or automatically performed.

10. The method according to claim 1, further comprising manually adjusting at least a subset of the determined machine parameters.

11. The method according to claim 1, wherein prior to executing a machining operation a controller verifies if any required tuning-sets are available.

12. The method according to claim 11, wherein operator assistance for the manual prioritization of target values is automatically launched when at least one of the required tuning-sets is not available.

13. The method according to claim 1, wherein the machining is divided into different machining objects including at least one of workpiece, group of workpieces, geometry, and group of machinings, and manually selecting priority values comprises optionally selecting different priority values for different machining objects.

14. The method according to claim 13, wherein the machining objects includes machining steps comprising at least one of roughing, semifinishing, finishing or superfinishing.

15. The method according to claim 1, wherein selection of target values is assigned to specific tools and tuning sets are called by tool change operations.

16. The method according to claim 1, wherein the priority values are selected from a limited number of priority values.

17. The method according to claim 1, wherein the priority values are manually selected by using a graphical user interface.

18. The method according to claim 1, wherein the priority values are selected by only one user action.

19. The method of claim 18, wherein the one user action comprises selecting a position of an input, wherein the position corresponds to different priority values for the target values.

20. A method for assisting an operator in setting optimized machine parameters of a machine tool, wherein the machine parameters are used for controlling machining, comprising manually selecting priority values for at least two mutually dependent target values representing machining performance, automatically determining the machine parameters by determining activation or non-activation of machine cycles based on the selected priority values.

manually adjusting the determined activation/non-activation of the machine cycles, further comprising determining and displaying an effect of manually adjusting the machine parameters on the target values, and determining and displaying an effect of manually adjusting the activation/non-activation of the machine cycles on the target values.

21. A method for assisting an operator in setting optimized machine parameters of a machine tool, wherein the machine parameters are used for controlling machining, comprising manually selecting priority values for at least two mutually dependent target values representing machining performance; and automatically determining the machine parameters based on the selected priority values, wherein the priority values are selected by only one user action comprising graphically moving a marker within a displayed area, wherein the position of the marker corresponds to certain priority values of the target values.

22. A method for assisting an operator in setting optimized machine parameters of a machine tool, wherein the machine parameters are used for controlling machining, comprising manually selecting priority values for at least two mutually dependent target values representing machining performance; and automatically determining machine parameters based on the selected priority values, wherein the priority values are selected by only one user action comprising graphically positioning a marker within a displayed polygon area, wherein each polygon vertex corresponds to one target value and wherein the distance between the position of the marker and the vertex correlates to the corresponding priority value.

23. The method of claim 22, wherein the displayed polygon is a triangle or a rhombus.

24. An operator support system for assisting an operator in setting optimized machine parameters and cycle parameters of a milling machine tool, wherein the machine parameters and cycle parameters are used for controlling machining, comprising a user interface for selecting priority values for at least two mutually dependent target values representing machining performance selected from the group consisting of accuracy, surface finish, and machine time;

means for selecting job attributes selected from the group consisting of complexity and workpiece weight; and, means for automatically determining the machine parameters and cycle parameters based on the selected priority values and job attributes.

25. The operator support system of claim 24, wherein manual prioritization of the target values is implemented on a programming station.

* * * * *